United States Patent
Murakami et al.

(10) Patent No.: US 9,504,002 B2
(45) Date of Patent: Nov. 22, 2016

(54) MOBILE TERMINAL AND BATTERY SAVING METHOD IN MOBILE COMMUNICATION SYSTEM

(71) Applicant: NTT DOCOMO, INC., Chiyoda-ku (JP)

(72) Inventors: Keiichi Murakami, Chiyoda-ku (JP); Yusuke Kushida, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 0 days.

(21) Appl. No.: 14/380,436

(22) PCT Filed: Feb. 6, 2013

(86) PCT No.: PCT/JP2013/052733
§ 371 (c)(1),
(2) Date: Aug. 22, 2014

(87) PCT Pub. No.: WO2013/140880
PCT Pub. Date: Sep. 26, 2013

(65) Prior Publication Data
US 2015/0065163 A1    Mar. 5, 2015

(30) Foreign Application Priority Data
Mar. 22, 2012   (JP) ................................. 2012-066268

(51) Int. Cl.
*H04W 24/00*   (2009.01)
*H04W 64/00*   (2009.01)
(Continued)

(52) U.S. Cl.
CPC ......... *H04W 64/00* (2013.01); *H04W 52/0209* (2013.01); *H04W 52/0254* (2013.01);
(Continued)

(58) Field of Classification Search
CPC ............ H04W 64/00; H04W 52/0209; H04W 52/0254; H04M 2250/12; H04M 1/72572
(Continued)

(56) References Cited

U.S. PATENT DOCUMENTS

| 7,209,753 B2 * | 4/2007 | Raith ........................ 455/456.1 |
| 2005/0157174 A1 * | 7/2005 | Kitamura ............ H04M 1/0245 348/207.99 |

(Continued)

FOREIGN PATENT DOCUMENTS

| JP | 2006-153695 | 6/2006 |
| JP | 2007-142905 | 6/2007 |

(Continued)

OTHER PUBLICATIONS

Takahashi, Technology Reports, NTT DOCOMO Technical Journal, vol. 17, No. 4, Jan. 1, 2010 (Jan. 1, 2010), vol. 17.*
(Continued)

*Primary Examiner* — Juan A Torres
(74) *Attorney, Agent, or Firm* — Oblon, McClelland, Maier & Neustadt, L.L.P.

(57) ABSTRACT

A mobile terminal that obtains location information and information of an identifier of an area in which the mobile station resides. The mobile station causing the location information to be obtained in a case that the identifier of the area in which the mobile terminal currently resides is different from an identifier of an area in which the mobile terminal resided in the past. The mobile terminal then reports the location information to a server.

7 Claims, 5 Drawing Sheets

(51) Int. Cl.
*H04W 52/02* (2009.01)
*H04M 1/725* (2006.01)

(52) U.S. Cl.
CPC ..... *H04M 1/72572* (2013.01); *H04M 2250/12* (2013.01); *Y02B 60/50* (2013.01)

(58) Field of Classification Search
USPC ....................................................... 455/456.1
See application file for complete search history.

(56) References Cited

U.S. PATENT DOCUMENTS

| | | | |
|---|---|---|---|
| 2007/0182630 A1* | 8/2007 | Angus | G01S 19/25 342/357.72 |
| 2008/0201076 A1* | 8/2008 | Huang | G01C 21/00 701/469 |
| 2009/0098880 A1* | 4/2009 | Lindquist | 455/456.1 |
| 2009/0131071 A1 | 5/2009 | Sako et al. | |
| 2009/0262673 A1* | 10/2009 | Hermersdorf | 370/310 |
| 2009/0271111 A1* | 10/2009 | Takanashi et al. | 701/209 |
| 2010/0033424 A1* | 2/2010 | Kabasawa et al. | 345/156 |
| 2010/0194632 A1 | 8/2010 | Raento et al. | |
| 2010/0197351 A1* | 8/2010 | Ewell, Jr. | H04M 1/66 455/565 |
| 2012/0258734 A1 | 10/2012 | Takahashi et al. | |
| 2013/0005357 A1 | 1/2013 | Takahashi et al. | |

FOREIGN PATENT DOCUMENTS

| | | |
|---|---|---|
| JP | 2011-223501 | 11/2011 |
| JP | 2012-21850 | 2/2012 |
| WO | 2006/112148 A1 | 10/2006 |
| WO | 2011/096130 A1 | 8/2011 |
| WO | 2011/129300 A1 | 10/2011 |

OTHER PUBLICATIONS

Combined Office Action and Search Report issued Apr. 15, 2015 in Chinese Patent Application No. 201380009623.9 (with English translation).

International Search Report issued Mar. 12, 2013, in PCT/JP2013/052733, filed Feb. 6, 2013.

Office Action issued May 13, 2014, in Japanese Patent Application No. 2012-066268, filed Mar. 22, 2012 (with English-language translation).

Extended European Search Report issued Sep. 25, 2015 in Patent Application No. 13763844.1.

Chinese Office Action dated Dec. 9, 2015, issued in Chinese Patent Application No. 201380009623.9 (with English translation).

\* cited by examiner

MOBILE TERMINAL AND BATTERY SAVING METHOD IN MOBILE COMMUNICATION SYSTEM

CROSS-REFERENCES TO RELATED APPLICATIONS

The present application is based on and claims the benefit of priority of Japanese Priority Application No. 2012-066268 filed on Mar. 22, 2012 the entire contents of which are hereby incorporated by reference.

TECHNICAL FIELD

The present invention relates to a mobile terminal and a battery saving method in a mobile communication system.

BACKGROUND ART

In a mobile communication system, various services based on location information of a mobile terminal are provided. In the case of these services, it is necessary for a mobile terminal to report its location information to a server. As an example, a mobile terminal performs a process of reporting its location measurement result to a server at every certain period as a background process (regarding this kind of technology, refer to Patent Document 1). Regarding the reporting by the mobile terminal, it is only performed in the case where a location difference between the current measurement result and the previous one is equal to or greater than a certain distance (for example, the difference is equal to or greater than 50 m), and otherwise the reporting is not performed by the mobile terminal because there is no use reporting.

RELATED ART DOCUMENT

[NON-PATENT DOCUMENT 1] Japanese Patent Application Publication No. 2011-223501 (paragraph 0008, etc.)

SUMMARY OF THE INVENTION

Problem to be Solved by the Invention

In the case of the related art, the location measurement is always performed at every certain period. Therefore, it is a waste of battery energy to measure the location in the case where the mobile terminal does not report the measurement result to the server.

A problem to be solved is to reduce the battery energy consumption of a mobile terminal which has a location measurement function.

Means for Solving the Problem

According to an aspect of the present embodiment, a mobile terminal in a mobile communication system includes a location measurement unit configured to obtain location information, an area ID obtaining unit configured to obtain identifier information for an area in which the mobile terminal currently exists, a control unit configured to cause the location measurement unit to obtain the location information in the case where the identifier for the area in which the mobile terminal currently resides is different from the identifier for the area in which the mobile terminal resided in the past, and a reporting unit configured to report the location information obtained by the location measurement unit to a server.

Effect of the Present Invention

According to an aspect of the present embodiment, the battery energy consumption of a mobile terminal, which has a location measurement function, can be reduced.

EMBODIMENTS FOR CARRYING OUT THE INVENTION

According to an embodiment of the present invention, location measurement is omitted in the case where a mobile terminal is in a standing-still state or in the case where the current area is the same as the area in the past. By this, it can be avoided to measure location wastefully. For example, it is determined whether the current area and the previous area, in which location of the mobile terminal was measured, are the same or not in the case where a user is operating the mobile terminal in the case where the mobile terminal is in a pocket of the user's clothes and the mobile terminal has moved along with the walking of the user. It can be considered that the mobile terminal is in a standing-still state in the case where the mobile terminal is standing still or in the case where it has moved but has moved just a walking distance. If the mobile terminal is in the standing-still state, then the location measurement is omitted because the measurement result would be almost the same as the previous one. Furthermore, even if the mobile terminal is not in the standing-still state, in the case where the current area is the same as the previous area, it can be expected that the measurement result would not change a lot so that the location measurement can be also omitted in this case and the energy consumption of the battery can be reduced.

The present embodiment will be described from the following viewpoints referring to the accompanying drawings.

1. Mobile terminal
2. An example of operations
3. A modified embodiment

1. Mobile Terminal

Figure 1:
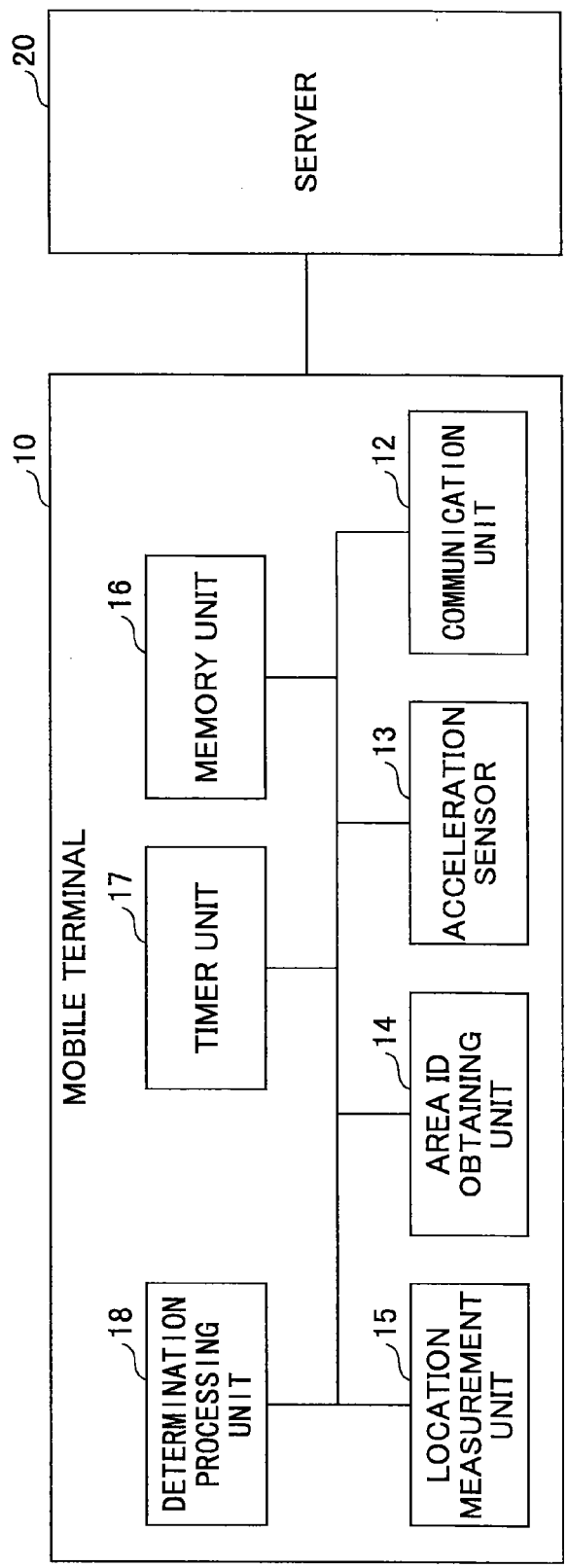
FIG. 1 is a functional block diagram of a mobile terminal according to the present embodiment.

FIG. 1 is a functional block diagram of the mobile terminal 10 according to the present embodiment. In FIG. 1, of various functional elements included in the mobile terminal 10, functional elements specifically related to the present embodiment are representatively shown. The mobile terminal 10 includes at least a communication unit 12, an acceleration sensor 13, an area ID obtaining unit 14, a location measurement unit 15, a memory unit 16, a timer unit 17 and a determination processing unit 18.

The mobile terminal 10 can communicate with a server 20 through a network and can be any appropriate apparatus that includes a location measurement function. The mobile terminal 10 is typically a mobile telephone, but may be another apparatus. For example, the mobile terminal 10 is, but not limited to, a user apparatus, an information terminal, an advanced mobile telephone, a smart phone, a tablet type computer, a personal digital assistant (PDA), a portable personal computer, a palm top computer, a laptop computer, etc.

The communication unit 12 performs a process for transmitting and receiving signals with network elements such as a server, etc. For example, the communication unit 12 performs a process for transmitting and receiving signals through any appropriate network such as a cellular network, a wireless local area network (WLAN), etc. The signals that the communication unit 12 transmits may be, for example, a reporting signal including location information of location measurement result. The signals that the communication unit 12 receives are, for example, a notification signal from a base station, a beacon signal from an access point, etc.

The acceleration sensor 13 detects the mobile terminal's motion from an acceleration. As will be described later, in the present embodiment, it is determined whether the detected acceleration is equal to or greater than a predefined value. It is determined that the mobile terminal is in a standing-still state if the acceleration is less than the predefined value and that the mobile terminal is in a moving state if the acceleration is equal to or greater than the predefined value. The standing-still state includes not only a case where the mobile terminal is completely standing still but also a case where it is moving at a low speed. For example, it may be determined that the mobile terminal 10 is in the standing-still state in the case where a person is walking, having the mobile terminal 10 with him. The acceleration may be determined as, for example, a component calculated by subtracting the gravity acceleration from the acceleration applied to the mobile terminal 10. The above predefined value can be set appropriately depending on the intended use.

The area ID obtaining unit 14 obtains identifier information of an area in which the mobile terminal 10 resides. The identifier of an area is, specifically, but not limited to, an identifier of a cell (cell ID) in a cellular system, an identifier of a sector that constitutes the cell (sector ID), an identifier of an access point in a WLAN (SSID), etc. The cell ID and the sector ID can be obtained from a notification signal transmitted by the base station of the cell. The SSID can be obtained from a beacon signal transmitted by the access point.

The location measurement unit 15 obtains location information of the mobile terminal 10. A location measurement method for obtaining the location information is typically a method of Global Positioning System (GPS) location measurement, a method of WiFi (wireless fidelity) location measurement, etc., but any appropriate method known in this technology field may be used.

The memory unit 16 stores data and information necessary for operations of the mobile terminal 10. Especially, the memory unit 16 stores the identifier obtained by the area ID obtaining unit 14, and a location measurement result by the location measurement unit 15 for at least a predefined period.

The timer unit 17 measures the predefined period and reports to the determination processing unit 18 that the predefined period has passed. The predefined period can be set appropriately depending on the intended use.

The determination processing unit (control unit) 18 performs controlling of operations of various functional elements or processing elements of the mobile terminal 10, and performs at the same time various determinations in the operations shown in FIG. 2 through FIG. 5. For example, the determination processing unit 18 includes a function of determining whether or not the user is currently operating the mobile terminal 10, a function of determining whether or not to cause the location measurement unit 15 to obtain location information, a function of determining whether or not the current location of the mobile terminal 10 is equal to or more than a predefined distance away from a past location, etc.

2. An Example of Operations

Figure 2:
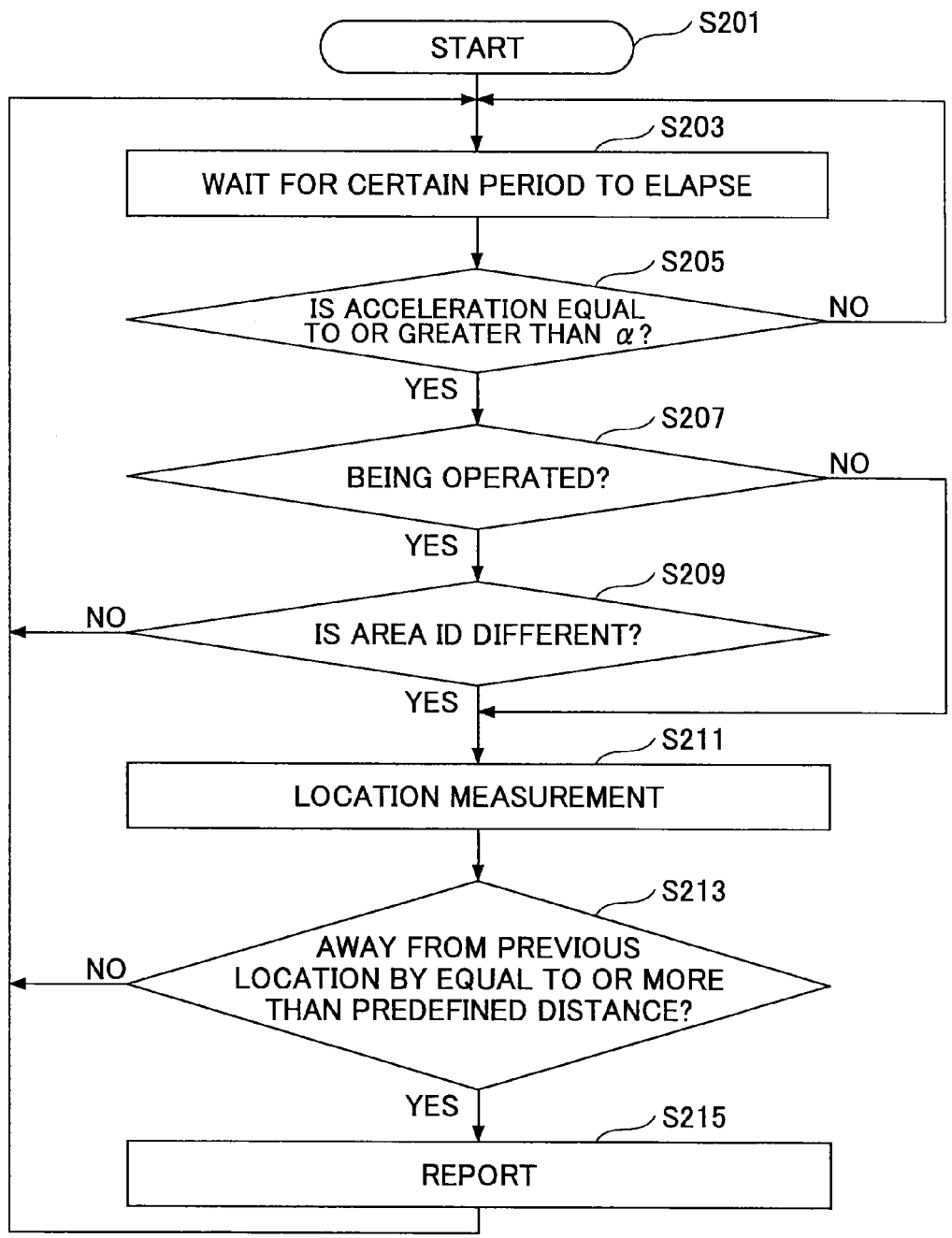
FIG. 2 is a flowchart illustrating an example of operations of the mobile terminal according to the present embodiment.

FIG. 2 is a flowchart illustrating an example of operations of the mobile terminal 10. The flow starts from step S201 and moves to step S203.

In step S203, the mobile terminal 10 waits for a predefined period of time to elapse. As described above, the specific value of the predefined period of time can be any value and it is measured by the timer unit 17. For the sake of convenience, the predefined period of time is measured in step S203. In addition to, or instead of, performing processes of steps S205 and thereafter in the every predefined period of time, the processes of steps S205 and thereafter may be performed based on some trigger. For example, the mobile terminal 10 may perform the processes of steps S205 and thereafter in response to a request from the base station.

In step S205, it is determined whether the acceleration of the mobile terminal 10 is equal to or greater than a predefined value α. As described above, the specific value of the predefined value can be any value. In step S205, it is determined whether the mobile terminal 10 is in a moving state (non standing-still state). The standing-still state includes not only a case where the mobile terminal 10 is completely standing still but also a case where it is moving at a low speed. Whether the speed, at which the mobile terminal 10 is moving, is included in the standing-still state is determined based on whether the mobile terminal 10 can move a distance at the speed, which distance requires the mobile terminal 10 to report to the server. In the case where the mobile terminal 10 is in the standing-still state, the flow returns to step S203. In the case where the mobile terminal 10 is in the moving state, the flow moves to step S207.

In step S207, it is determined whether the mobile terminal 10 is being operated, or whether the mobile terminal 10 is being used. This determination may be made based on whether some information is being input to an input interface of the mobile terminal 10. In this case, if some information is being input, then the mobile terminal 10 is being operated or being used. In the case where the mobile terminal 10 is a foldable type, the determination may be made based on whether the mobile terminal 10 is in a folded state. In this case, where the mobile terminal 10 is not folded (in the unfolded state), the mobile terminal 10 is being operated or being used. Or, the determination may be made based on whether the operation mode of the mobile terminal 10 is a sleep mode (standby mode, idle mode, or intermittent reception mode). In this case, where the operation mode is not a sleep mode, the mobile terminal 10 is being operated or being used. In the case where it is determined that the mobile terminal 10 is being operated, the flow moves to step S209.

In step S209, the mobile terminal 10 obtains information of an identifier of an area in which the mobile terminal 10 resides. The mobile terminal 10 can obtain the identifier of the current area by receiving a notification signal or a beacon signal. For the sake of convenience, it is assumed that the mobile terminal 10 obtains a sector ID as an identifier of the area, which sector ID indicates one of sectors that constitute a cell. In step S209, the mobile terminal 10 determines whether the current sector ID is different from the latest sector ID of sector IDs obtained in the past. The sector IDs obtained in the past are stored in the memory unit 16. The "latest", in the case of the shortest time, corresponds to the period that is measured by the timer 17.

In the case where the current sector ID is the same as the latest sector ID ("NO" for step S209), the flow returns to step S203. The reason is that the mobile terminal 10 is remaining in the same sector so that the location measurement result is expected to be the same as the previous result and it is not necessary to newly measure the location. In the case where the current sector ID is different from the latest sector ID ("YES" for step S209), the flow moves to step S211.

The identifier of the area is not limited to an identifier of a sector that constitutes a cell (sector ID), and other identifiers may be used for the identifier of the area. For example, a cell identifier (cell ID), a Service Set Identifier (SSID) of the access point, etc., may be used. The cell ID and the sector ID can be obtained by receiving the notification signal transmitted by the base station in the cell. The SSID can be obtained by receiving the beacon signal transmitted by the access point. In the case where a cell ID is used instead of a sector ID, in step S209, the mobile terminal 10 determines whether the current cell ID and the latest cell ID are different. In the case where an SSID is used instead of a sector ID, in step S209, the mobile terminal 10 determines whether the current SSID and the latest SSID are different.

In step S211, the mobile terminal 10 performs location measurement and obtains a location measurement result which indicates the current location. The location measurement method is, typically, GPS location measurement or WiFi location measurement, but other location measurement methods may be used. In an example of operations shown in the figure, in the case where the mobile terminal 10 is in the standing-still state ("NO" for step S205), or in the case where the sector IDs are the same ("NO" for step S209), the location measurement is not performed. The location measurement is performed only: in the case the sector IDs are different (S209) while the mobile terminal 10 is in an operational state where the acceleration is equal to or greater than α (S205); or in the case where the mobile terminal 10 is not being operated (S207). Therefore, the wasteful location measurement can be effectively omitted in the case where it is expected that the measured location would not be very different even if the location measurement were to be performed.

In step S213, the mobile terminal 10 calculates a distance between the current location measured just now and the location indicated by the previous location measurement result, and determines whether the distance is equal to or greater than a predefined value. The predefined value is, as an example, 50 m, but other values may be used. In the case where the distance is not equal to or greater than the predefined value, the flow returns to step S203, and in the case where the distance is equal to or greater than the predefined value, the flow moves to step S215.

In step S215, the mobile terminal 10 reports the current location measurement result to the server 20. Then, the flow returns to step S203 and the procedures described above are repeated.

3. A Modified Embodiment

In the case of an example of operations shown in FIG. 2, if the current sector ID and the previous sector ID are the same, then it is expected that the mobile terminal 10 is not moving a lot and the location measurement is not performed ("NO" for step S209). However, in the case where the cell or the sector, in which the mobile terminal 10 resides, covers a fairly broad area (in the case of a large zone), even if the sector IDs are the same, there is a possibility that the mobile terminal 10 is moving a lot. In such a case, even if the sector IDs are the same, the location measurement should be performed periodically and the mobile terminal 10 should report the current location to the server. The cells and the sectors that cover such a broad area can be known beforehand. For example, the mobile terminal 10 may store a table which indicates whether a cell or a sector is a large zone. Such information, for example, may be reported to the mobile terminal 10 by a notification signal or a beacon signal or may be shared in the system as known information. While the mobile terminal 10 always performs location measurement regardless whether or not the sector IDs are different in the case where the sector ID of the area, in which it resides, corresponds to a large-zone sector ID, the mobile terminal 10 may omit performing the location measurement when the sector IDs are the same in the case where the sector ID does not correspond to a large-zone sector ID.

Also, there is a case where the location measurement should be performed even in the case of a non-large zone. For example, in the case where an access point of a WLAN is placed in a train car, the mobile terminal 10 located in the train car receives the same SSID regardless of the train car movement. In the case where the area in which the mobile terminal 10 communicates is the inside of the train car, it is desirable for the mobile terminal 10 to report the location measurement result to the server even if the current SSID is the same as the past SSID. The reason is that there is a strong possibility that the location measurement result has greatly changed. A table which indicates which SSID corresponds to such a "moving" area may be stored in advance in the mobile terminal 10. This kind of information may be reported to the mobile terminal 10 by a notification signal or a beacon signal, or may be shared in the system as known information.

From the viewpoint of dealing with a large-zone case or an in-the-train-car case, it is preferable that the mobile terminal 10 determine whether it is in a specific area, and omit performing the location measurement under certain conditions as shown in FIG. 2 only in the case where it is not in the specific area.

Figure 3:
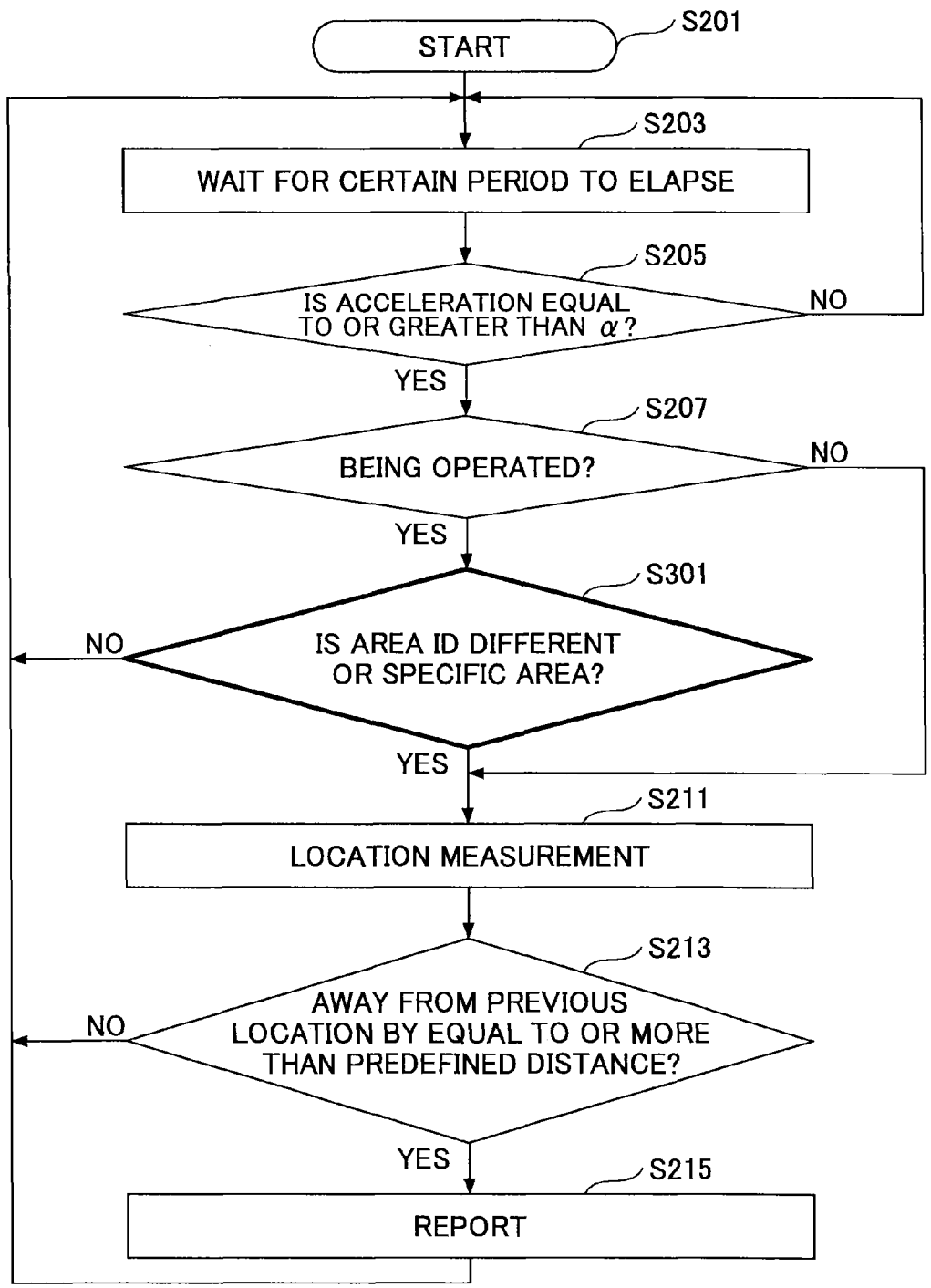
FIG. 3 is a flowchart illustrating an example of operations of the mobile terminal in a modified embodiment of the present invention.

FIG. 3 is a flowchart illustrating an example of operations of the mobile terminal 10 in the modified embodiment of the present invention. In general, the flow is the same as the one shown in FIG. 2, but the two flows are different mainly in that the process in step S209 in FIG. 2 becomes the process in step S301 in FIG. 3. In step S301, the mobile terminal 10, in addition to determining whether the current area (e.g., sector ID) and the previous area (e.g., sector ID) are different, determines whether the current area (e.g., sector ID) corresponds to a specific area. Regarding the specific area, it can be identified by a cell ID, a sector ID, an SSID, etc., that correspond to the large-zone or the in-the-train-car described above, and such information is stored, for example, as a table in the mobile terminal 10. In step S301, in the case where the current area is different from the previous area, or in the case where the current area corresponds to a specific area, the flow moves to step S211, in which the location measurement is performed, and the described processes thereafter are performed. On the other hand, in step S301, in the case where the current area is the same as the previous area and the current area does not correspond to a specific area (for example, in the case where the sector IDs are the same and the current sector ID does not correspond to the large-zone or the in-the-train-car), the flow returns to step S203 without performing location measurement, and the described processes are performed.

Figure 4:
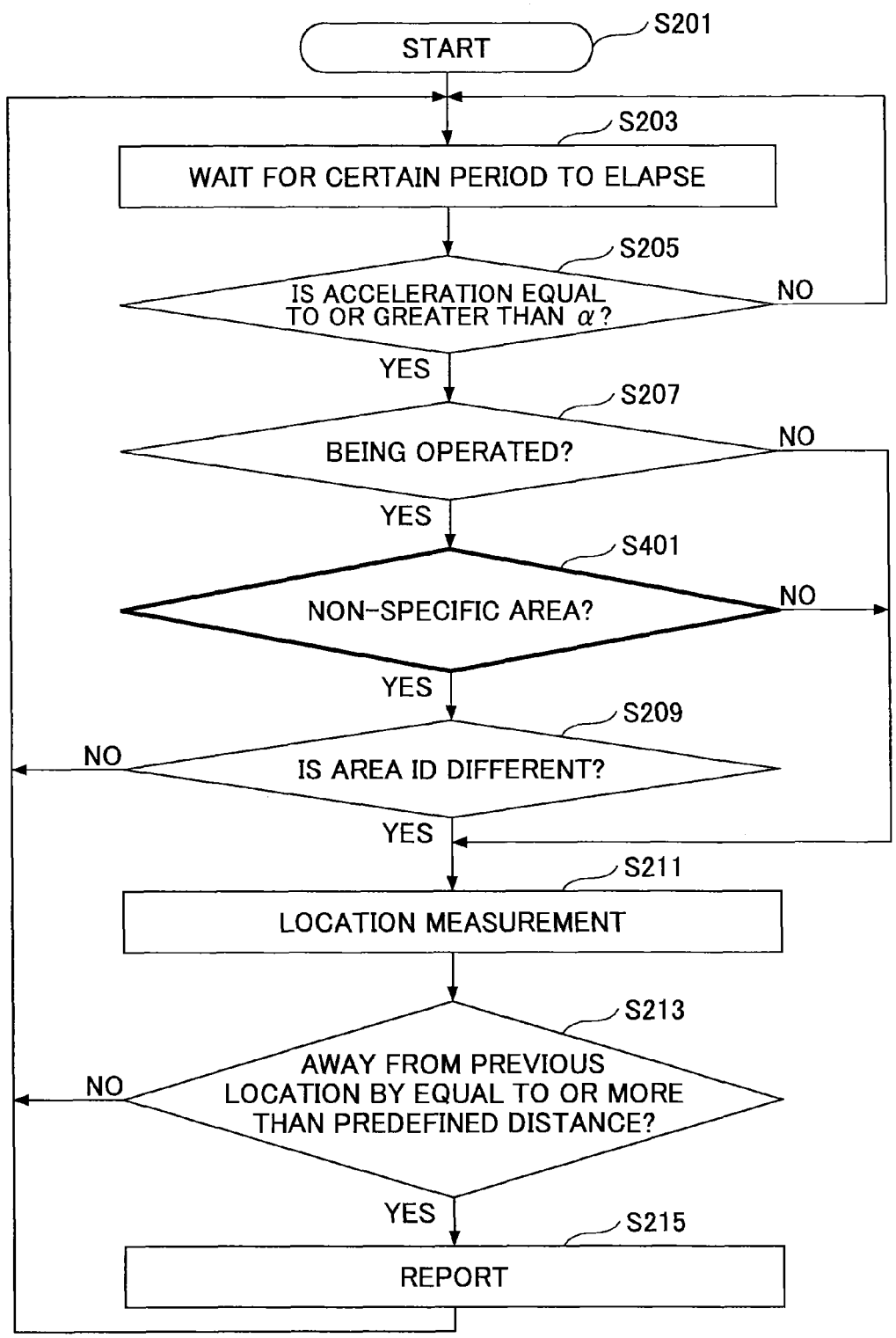
FIG. 4 is a flowchart illustrating an example of operations of the mobile terminal in another modified embodiment of the present invention.

FIG. 4 is a flowchart illustrating an example of operations of the mobile terminal in another modified embodiment of the present invention. The example of operations is, in general, the same as the one shown in FIG. 2, but it differs mainly in that step S401 is performed after step S207. In step S401, it is determined whether the current area corresponds to a specific area. Regarding the specific area, it can be identified by a cell ID, a sector ID, an SSID, etc., that correspond to the large-zone or the in-the-train-car described above. In the case where the current area corresponds to a non-specific area, the flow moves to step S209 and the described processes are performed. In the case where the current area does not correspond to a non-specific area, the flow moves to step S211, in which the location measurement is performed, and the described processes are performed.

Figure 5:
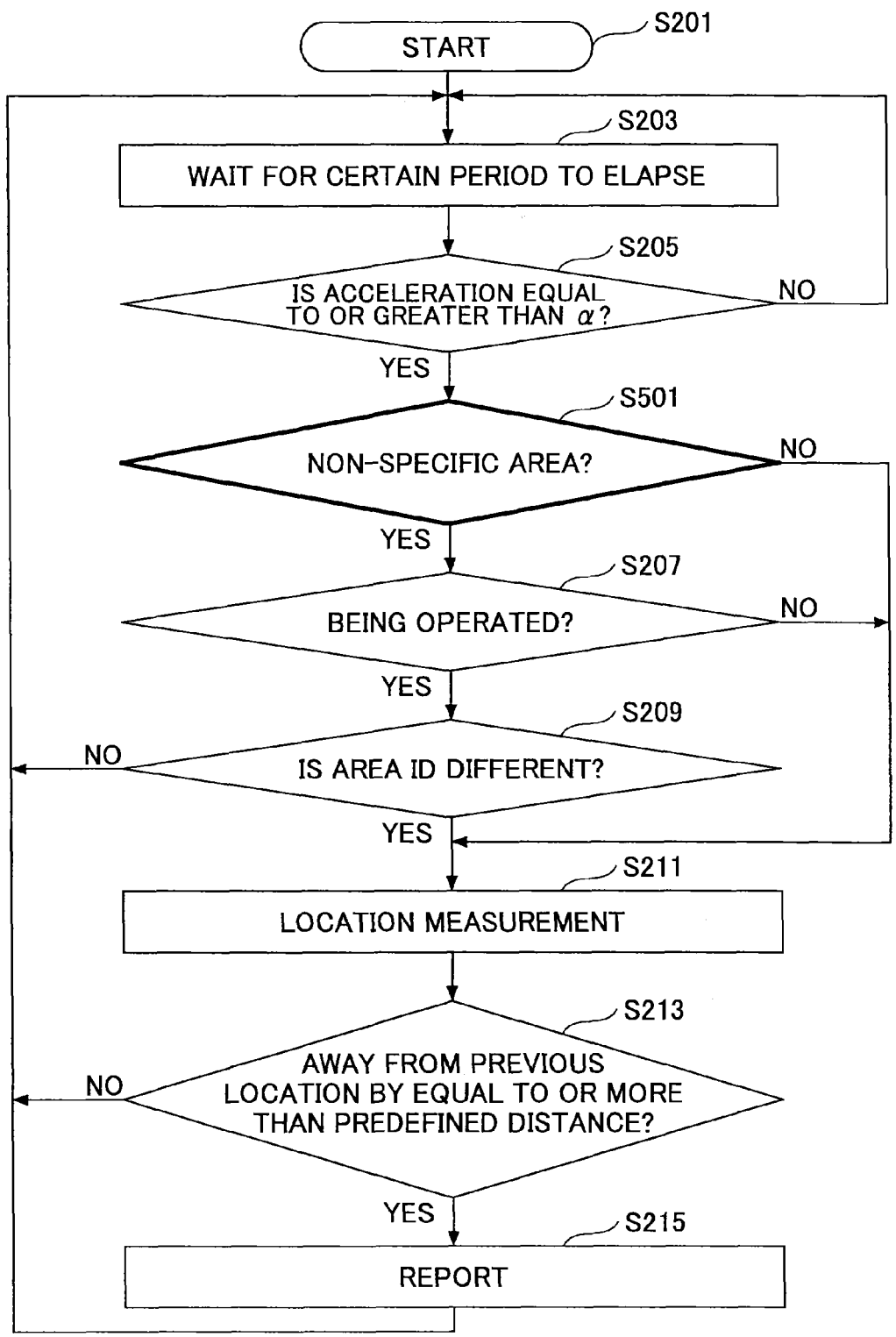
FIG. 5 is a flowchart illustrating an example of operations of the mobile terminal in yet another modified embodiment of the present invention.

FIG. 5 is a flowchart illustrating an example of operations of the mobile terminal 10 in yet another modified embodiment of the present invention. The example of operations is, in general, the same as the one shown in FIG. 2, but it differs mainly in that step S501 is performed after step S205. In step S501, it is determined whether the current area corresponds to a specific area. Regarding the specific area, it can be identified by a cell ID, a sector ID, an SSID, etc., that corresponds to the large-zone or the in-the-train-car described above. In the case where the current area corresponds to a non-specific area, the flow moves to step S207 and the described processes are performed. In the case where the current area does not correspond to a non-specific area, the flow moves to step S211, in which the location measurement is performed, and the described processes are performed. FIG. 3 through FIG. 5 only show examples of operations, and whether the mobile terminal 10 is in a specific area may be determined by using any appropriate method.

As shown in the above, the present invention has been described referring to specific embodiments. These embodiments are just examples and a person skilled in the art would easily understand various modified embodiments, amended embodiments and replacement embodiments. For example, the present invention may be applied to any appropriate mobile terminal that performs location measurement. Specific numbers are used in description for the sake of easy understanding, but those numbers are used just as examples, and, unless otherwise noted, any appropriate number can be used. Division of embodiments or items is not essential for the present invention, and things described in more than one item may be used in combination as necessary, or a thing described in an item may be applied to a thing described in a different item (as long as it does not conflict). Borders of function units or processing units in functional block diagrams do not necessarily correspond to borders of physical components. Operations of multiple function units may be performed in one physical component, or operations of one function unit may be performed by multiple physical components. For the sake of convenience, devices of the present embodiments are described using a functional block diagram, but those devices may be realized as hardware, software, or combination of both. The software may be provided in a Random Access Memory (RAM), a Flash memory, a Read-Only Memory (ROM), an EPROM, an EEPROM, a register, a hard disk (HDD), a removable disk, a CD-ROM, a database, a server, or any other appropriate memory media. The present invention is not limited to the embodiments described above, but various modified embodiments, amended embodiments and replacement embodiments, etc., are included in the present invention without departing from the spirit of the present invention.

DESCRIPTION OF THE REFERENCE NUMERALS

10 Mobile terminal
12 Communication unit
13 Acceleration sensor
14 Area ID obtaining unit
15 Location measurement unit
16 Memory unit
17 Timer unit
18 Determination processing unit

The invention claimed is:

1. A mobile terminal in a mobile communication system, the mobile terminal comprising:
   location measurement circuitry configured to obtain location information;
   a communication interface configured to obtain information of an identifier of an area in which the mobile terminal resides; and
   control circuitry configured to
      cause the location measurement circuitry to obtain the location information in the case where the mobile terminal is not being operated while the mobile terminal is in an accelerated state, and
      cause the location measurement circuitry to obtain the location information (1) in the case where it is determined that some information is being input to an input interface of the mobile terminal and the identifier of the area in which the mobile terminal currently resides is different from an identifier of the area in which the mobile terminal resided in the past; or (2) in the case where it is determined that the mobile terminal is a foldable type and the mobile terminal is not in a folded state and the identifier of the area in which the mobile terminal currently resides is different from the identifier of the area in which the mobile terminal resided in the past, wherein
   the communication interface is configured to report the location information obtained by the location measurement circuitry to a server.

2. The mobile terminal as claimed in claim 1, further comprising:
   an acceleration sensor configured to detect an acceleration of the mobile terminal, wherein
   the control circuitry is configured to cause the location measurement circuitry to obtain the location information in the case where:
      the acceleration sensor detects an acceleration equal to or greater than a predefined value, and the identifier of the area in which the mobile terminal currently resides is different from the identifier of the area in which the mobile terminal resided in the past.

3. The mobile terminal as claimed in claim 1, wherein the reporting communication interface reports the location information obtained by the location measurement circuitry to the server in the case where the current location of the mobile terminal is equal to or more than a predefined distance away from a past location.

4. The mobile terminal as claimed in claim 1, wherein in the case where an area in which the mobile terminal resides corresponds to a specific area, the control circuitry causes the location measurement circuitry to obtain the location information regardless of the identifier of the area in which the mobile terminal currently resides.

5. The mobile terminal as claimed in claim 2, further comprising:
   a timer configured to detect an elapse of a certain period, wherein
   the control circuitry, every time the certain period elapses, causes the location measurement circuitry to obtain the location information in the case where:
      the acceleration sensor detects an acceleration that is equal to or greater than the predefined value, and
      the identifier of the area in which the mobile terminal currently resides is different from the identifier of the area in which the mobile terminal resided in the past.

6. The mobile terminal as claimed in claim 5, wherein the control circuitry, every time the certain period elapses, causes the location measurement circuitry to obtain the location information in the case where:
   it is determined that the acceleration sensor detects an acceleration that is equal to or greater than the predefined value,
   the mobile terminal is being operated by a user, and
   the identifier of the area in which the mobile terminal currently resides is different from the identifier of the area in which the mobile terminal resided in the past.

7. A battery saving method of a mobile terminal in a mobile communication system, the battery saving method of the mobile terminal comprising:
   a step of obtaining information of an identifier of an area in which the mobile terminal currently resides,
   a step of causing a location measurement unit to obtain location information in the case where the mobile terminal is not being operated while the mobile terminal is in an accelerated state,
   a step of causing the location measurement unit to obtain the location information of the mobile terminal (1) in the case where it is determined that some information is being input to an input interface of the mobile terminal and the identifier is different from an identifier of an area in which the mobile terminal resided in the past; or (2) in the case where it is determined that the mobile terminal is a foldable type and the mobile terminal is not in a folded state and the identifier of the area in which the mobile terminal currently resides is different from the identifier of the area in which the mobile terminal resided in the past, and
   a step of reporting the location information obtained by the location measurement unit to a server.

* * * * *